United States Patent [19]
Strolle et al.

[11] Patent Number: 5,574,565
[45] Date of Patent: Nov. 12, 1996

[54] DATA PLACEMENT ON TAPE FOR A DIGITAL VIDEO TAPE RECORDER SUITABLE FOR HIGH SPEED PICTURE PLAYBACK

[75] Inventors: Christopher H. Strolle, Glenside, Pa.; Steven T. Jaffe, Freehold; Tianmin Liu, Lawrenceville, both of N.J.

[73] Assignee: Samsung Electronics Co., Ltd., Suwon, Rep. of Korea

[21] Appl. No.: 335,211

[22] Filed: Oct. 28, 1994

Related U.S. Application Data

[62] Division of Ser. No. 983,741, Dec. 1, 1992, Pat. No. 5,398,143.

[51] Int. Cl.$^6$ .............................. H04N 5/76; H04N 5/78; G11B 5/00; G11B 5/09
[52] U.S. Cl. .............................. 386/81; 360/48; 386/112; 386/65
[58] Field of Search ..................... 358/312, 310, 358/335, 342; 360/10.1, 10.3, 32, 48, 53; H04N 5/76, 5/92

[56] References Cited

U.S. PATENT DOCUMENTS

| | | | |
|---|---|---|---|
| 4,751,589 | 6/1988 | Kominami et al. | 350/10.3 |
| 4,887,169 | 12/1989 | Bannai et al. | 358/335 |
| 5,136,391 | 8/1992 | Minami | 358/310 |
| 5,245,483 | 9/1993 | Van Gestel | 360/48 |
| 5,440,401 | 8/1995 | Parulski et al. | 358/342 |

*Primary Examiner*—Thai Q. Tran
*Attorney, Agent, or Firm*—Allen LeRoy Limberg

[57] ABSTRACT

A video tape includes a plurality of parallel slant tracks formed therein. Each track includes a plurality of successively recorded sync blocks. In each sync block, a respective portion of a first digital signal recorded therein represents a predetermined portion of an input image with relatively low resolution, and a respective portion of a second digital signal recorded therein represents substantially the same predetermined portion of the input image with relatively high resolution. Successive sync blocks include consecutive portions of the first digital signal, which portions correspond to spatially adjacent portions of the input image. Preferably, each sync block includes a fixed number of bits of the first digital signal, which is decodable without reference to any image coded signal from other sync blocks. The first digital signal codes the input images as raster scanned in reduced-resolution form for reproduction during a trickplay mode and the second digital signal comprises variable-bit-length codes permitting reproduction of the input images in full-resolution form during a normal-play mode. The second digital signal is not decodable unless there is reference to the portion of the first digital signal recorded in the same sync block, or portions of the second digital signal in other ones of the sync blocks, or to the portion of the first digital signal recorded in the same sync block and portions of the second digital signal in other ones of the sync blocks.

20 Claims, 2 Drawing Sheets

DATA PLACEMENT ON TAPE FOR A DIGITAL VIDEO TAPE RECORDER SUITABLE FOR HIGH SPEED PICTURE PLAYBACK

This is a division of application Ser. No. 07/983,741, filed Dec. 1, 1992 and now U.S. Pat. No. 5,398,143.

BACKGROUND OF THE INVENTION

1. Field of the Invention

The present invention relates to a digital video tape recorder (VTR) and a record carrier therefore, and more particularly, to a digital VTR and record carrier capable of forming/providing a video image during a picture search (so-called high-speed search or trickplay) mode where the record carrier is moved past the VTR playback heads at a speed different from the recording speed.

2. Description of the Prior Art

In a VTR, magnetic pick-up/record heads are mounted on a cylindrical drum, and a record carrier (e.g., magnetic tape) is wrapped about one-half way around the drum in a helical manner. As shown in FIG. 1, during recording or playback, the drum (not shown) rotates and the tape 10 is driven in the direction indicated by arrow 12 past the drum at a constant speed, thereby recording or picking-up video information signals in parallel slant (helical) tracks 14. An example of the movement of the heads relative to tracks 14 is shown by arrow 16.

During high-speed playback (or so-called trickplay) the tape is driven past the drum at a speed higher than the recording speed. This results in the magnetic heads sweeping across multiple slant tracks for each scan across the tape, as shown by the dotted arrow in FIG. 1, picking-up only a portion of the video information signal from each recorded track.

A digital VTR providing a high-speed playback mode presents some troublesome requirements. This is so because conventional digital image compression coding techniques typically use a variable number of bits to code an image, depending upon the image complexity. Therefore, when the VTR is operated in the high-speed playback mode, continuous recovery of the coded data is not possible and only portions of the recorded image are recovered. Without complete recovery of all of the coded data, image reconstruction will be severely degraded.

In order to allow proper operation of the high-speed search mode in a digital VTR, there are two basic requirements. First, there must be a fixed relationship between the position on the tape of the recovered high-speed data and the position of the reconstructed image that this data represents. Second, the bit rate of the recorded data must be fixed for some sequence of the recorded images, so that linear advances on the tape correspond to equivalent advances of the image sequence. These requirements conspire to make the application of variable length coding schemes difficult to use for digital VTR's. Since many of the current low bit rate image compression coding algorithms use a variable bit length coding schemes (incorporating, e.g., interframe motion compensation), they are not well-suited for application to digital VTRs.

U.S. Pat. No. 5,136,394 issued Aug. 4, 1992 to Haikawa et al. discloses a digital VTR having an image coding scheme which accommodates a picture search mode of operation. As disclosed therein, each image is divided into three types of pixels, namely, a, b and c, respectively, where there are twice as many c type pixels per image line as there are a and b type pixels per image line. The a, b and c type of pixels for each image are grouped together and then sequentially recorded on the tape. Furthermore, each of the groups are sub-divided into two further sub-groups, corresponding to the upper m bits and the lower n bits of the digital data representative of each pixel. During a picture search mode, only the upper bits of e.g., the "a" type pixels are recovered from the tape for providing a usable "rough" image. However, very limited picture search freedom is provided by this technique, since scanning and recovery of the pre-recorded "a" type pixels on the tape must occur.

U.S. Pat. No. 5,136,391 issued Aug. 4, 1992 to M. Minami describes a digital VTR wherein the input image is successively subsampled to divide it into a main image having low resolution components and two hierarchical subimages having the higher resolution image components. The main image is fixed bit-length coded and recorded along a central portion of each magnetic tape track and the subimages are variable bit-length coded (using, for example, adaptive DCT techniques) and recorded on the magnetic tape tracks symmetrically about opposite sides where the main image is recorded. This technique places undesirable requirements on the trickplay operation and apparatus, since it is required that the central portion of each previously recorded track be recovered in order to reconstruct a usable image.

Another technique for solving this problem is described in U.S. Pat. No. 4,807,053 issued Feb. 21, 1989 to Mr. Heignemas. As described therein, an image compression algorithm is used which results in a poor reconstruction of the image when less than all of the recorded picture data is recovered, and, when all of the data is recovered results in the best reconstruction of the image. First, the input image is divided into sub-image blocks which are encoded using a first transform coding technique. Then, successive subimages are analyzed for motion and given a motion code depending on the degree of difference between the motion of the sub-images. If the next sub-image represents little motion from the prior sub-image, as indicated by it's motion code, a second transform coding technique could be used, which, when combined with the prior sub-image, enables more accurate reconstruction of the input sub-images. If, however, the motion code indicates that there is greater than a certain minimum amount of motion between the successive sub-images, then the first encoding technique is used again. Thus, when all the sub-images are recovered in order, during normal play, the use of the motion codes allows sub-images with similar motion codes to be combined (even those from prior frames or fields, thus equivalent to an interframe coding type of processing) which is an advantageous image compression technique. However, if less than all the sub-image data is recovered, only those sub-images having similar motion codes and specific transform codes can be combined. If the successively recovered sub-images don't have motion codes and transform codes which allow their combination for generating a higher accuracy sub-image, they are not combined and instead the prior recovered sub-image is repeated for reconstructing the original image. This technique is not particularly advantageous since it results in a "blockiness" in the recovered signal and furthermore, the data compression is not as effective as other of the more conventional types of image compression algorithms.

Another technique developed for video image compression which takes into account the "sample skipping" inherent when recovering data from a record carrier at a speed other than its recording speed, is described by Wu et al. in an article entitled "Rate-Constrained Optimal Block-Adaptive Coding for Digital Tape Recording of HDTV" published in the IEEE Transactions on Circuits and Systems for Video Technology, Vol. 1, No. 1, March 1991. In this technique, each frame (or field) of video is partitioned into a small number of sub-images. Each sub-image is partitioned into non-overlapping blocks and each block is coded by one of a finite set of predesigned block quantizers covering a range of bit rates, which results in each sub-image being independently coded with a fixed number of bits. A near-optimal quantizer allocation algorithm based on the Lagrange Multiplier method is used to select a particular quantizer for each block. The objective is to minimize the distortion of the entire sub-image under the constraint of a fixed number of total bits for each sub-image. This rate-constrained block-adaptive technique utilizes a multi-stage compression algorithm comprising discrete cosine transformation followed by vector quantization. Although this technique allows for data reconstruction during trickplay, the multi-stage compression coding technique is expected to result in an undesirable "blockiness" of the reconstructed image during trickplay. Furthermore, the block-adaptive technique results in less than optimum data compression.

SUMMARY OF THE INVENTION

An object of the present invention is to enable recovery and reproduction of a recorded image in a digital VTR when operating in a trickplay mode.

Briefly stated, in a digital VTR in accordance with the invention, the digital video information is only separated into two data streams, the trickplay data stream (TDS) and the normal play data stream (NPDS). Both data streams are representative of the same images, but the TDS uses less bits per given image than the NPDS, and therefore the TDS represents a lower resolution image as compared to the NPDS. Consecutive portions of both data streams are grouped together to form successive sync blocks, which are then successively recorded on the record carrier in parallel slant tracks. During trickplay recovery, only the recovered TDS portion of the sync words are used to reconstruct the image, and during normal playback, the NPDS portion is used alone, or in conjunction with the TDS portion, to reconstruct the image. The TDS portion is fixed bit-length coded, so that the TDS portion of each and every one of the sync blocks (or words) recovered as the magnetic tape scans obliquely across the multiple tracks, can be used to reconstruct an image. Fixed bit-length coding is advantageously appropriate for the low resolution TDS portion. The NPDS, having the requirement to represent the normal play image, has a much higher data rate, and therefore advantageously uses a coding scheme employing variable bit-length coding algorithms.

In accordance with one aspect of the invention, the TDS portion of each sync block is, on the average, representative of a complete horizontal line of the image.

In accordance with a further aspect of the invention, the TDS portion is formed by subband decomposition of the original image to form smaller images, which are then coded using vector quantization techniques.

In accordance with a still further aspect of the invention, in a preferred embodiment of the invention, the TDS and NPDS are related in a hierarchical fashion, so that both the TDS and NPDS portions of each sync word are used to reproduce a recovered image during normal play. This improves even further the efficiency of the image compression.

Thus, a main advantage of the present invention is that conventional parallel slant track recording techniques are used, while allowing for image reconstruction during high-speed search. This advantage results from including in the successively recorded sync blocks, consecutive portions of the fixed bit-length coded TDS. Since the TDS portion of each sync block is fixed bit-length coded, it can be decodable without reference to other ones of the sync blocks, which may not be recovered from the tape, and since the TDS portions are consecutive, as the multiple tracks are scanned during the high-speed search mode, unrecovered TDS portions of missed sync blocks can be replaced with TDS data which is representative of similarly positioned image portions from other sync blocks which are recovered.

Furthermore, since the TDS portion of each sync block is, on the average, representative of a complete horizontal line of the recovered image, a more pleasing image is reconstructed during trickplay. Additionally, trickplay operation can start at any point along a recorded track, without need for any special magnetic head phase control.

These and other objects and advantages of the present invention will become more apparent from the following detailed description of the present invention when read in conjunction with the accompanying drawings.

DETAILED DESCRIPTION OF THE INVENTION

Figure 1:
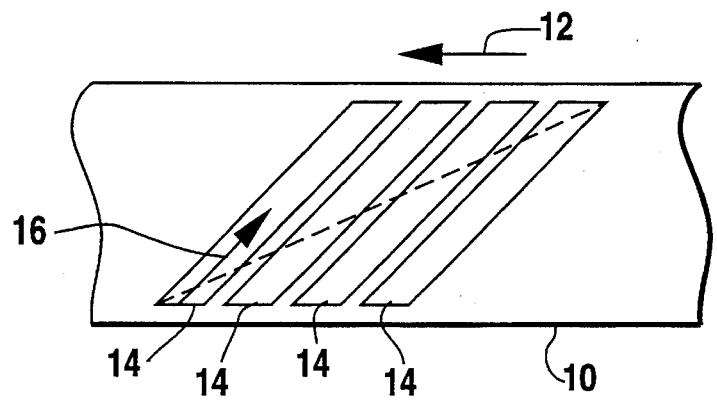
FIG. 1, previously described, illustrates the prior art helical scan parallel tracking format and a problem which occurs during trickplay.
Figure 2:
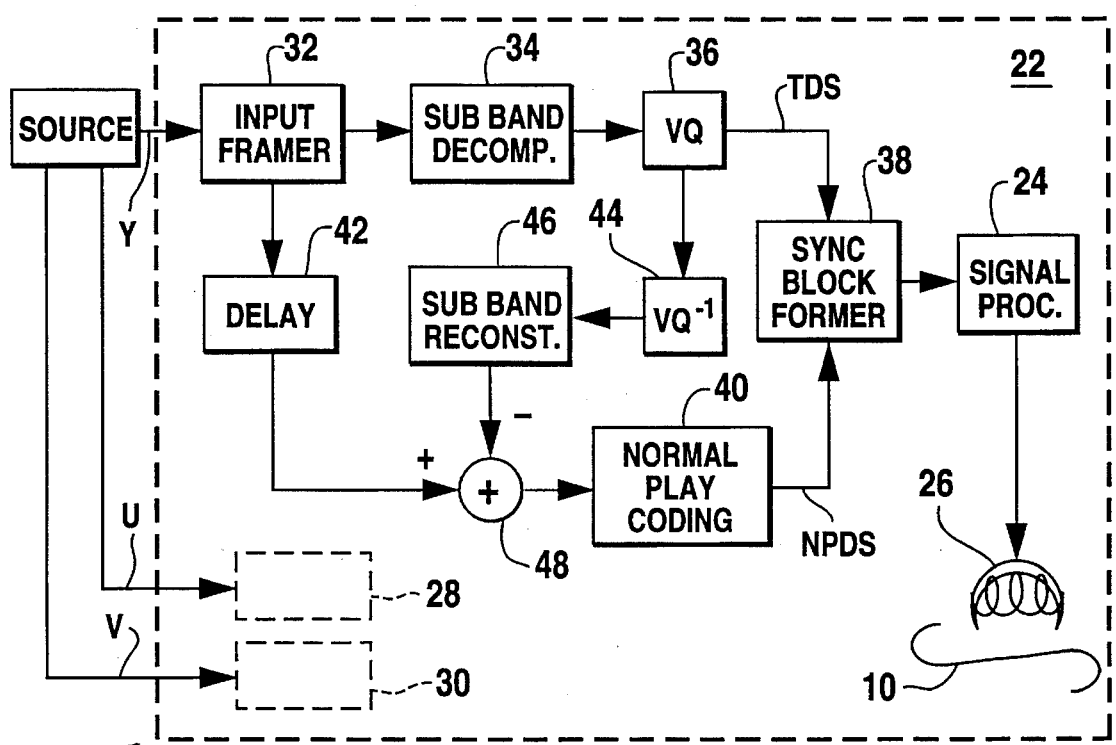
FIG. 2 is a block diagram of the inventive compression coding algorithm, as used in a digital VTR.

Referring to FIG. 2, the recording portion of a digital VTR 20 constructed in accordance with one aspect of the invention is shown. VTR 20 includes a video signal compression encoding portion 22 constructed in accordance with the principles of the invention and a conventional signal processing portion 24 and recording head 26 for digitally recording the video signal on a magnetic tape 10. For Simplicity, only one encoding portion 22 is shown, which receives a luminance (Y) signal from a digital signal source coded, for example, in accordance with CCIR Recommendation 601. Additional encoding circuits 28 and 30 would also be required for processing the chrominance components, i.e., U and V.

An input framer 32 receives the successive frames of source digital video and provides it to a subband decomposition module 34 where it is decimated so as to make smaller image frames. For example, for the luminance component of each input frame, the frame size could be 720 pixels horizontally by 480 lines (pixels) vertically. The subband decomposition and decimation results in luminance fields having 180 pixels horizontally by 120 lines vertically. This is accomplished, as described in greater detail with respect to FIG. 5, by low pass filtering and decimation, twice in the horizontal direction and twice in the vertical direction. These smaller images are then coded for data compression using conventional quantization techniques by a Vector Quantization (VQ) module 36, to form the Trickplay Data Stream (TDS). For accomplishing vector quantization, these smaller images must be organized into fixed size vectors. In the present embodiment, either one of two different vector sizes are preferred, sixteen small pixels horizontally and one pixel vertically (16×1) or eight small pixels horizontally and two pixels vertically (8×2). These vectors are then quantized in accordance with conventional techniques, using a fixed-size code book for generating TDS code words. These VQ code words are then used to form the TDS.

The TDS is applied as a first input to a sync block former 38, which combines the TDS code words with code words representative of the normal play video signal as will be described next, in successive ones of the sync blocks.

Simultaneously with the formation of the TDS, a normal play data coder 40 processes the input image frames in accordance with any one of several known high quality image compression coding techniques, preferably employing variable bit-length coding, such as that proposed by the MPEG Standards Committee and described, for example, in their Document ISO-IEC/JTC1/SC29/WG11, Document #AVC260 dated May 1992 entitled "Test Model 1", and MPEG 92/160, for developing successive code words representative of the normal play image, called a Normal Play Data Stream (NPDS). Of course, appropriate modifications may be necessary to the conventional MPEG techniques to constrain the coding to be fixed over some desired number of frames of the input sequence, e.g., four as a trade off between desired edit boundaries and compression ratio. The NPDS is then supplied as a second input to the sync block former 38.

A delay module 42 provides a delay to the input frames supplied to coder 40, so that when sync block former 38 groups portions of the TDS and NPDS into a single sync block or word, the portion of the input frame which each grouped data stream represents is substantially similar. However, since the TDS is fixed-length coded, consecutive TDS portions in successive ones of the sync blocks results in a predetermined and known correlation between the position on the tape of the sync block and the position in the recorded image which is represented by the TDS in that sync block. Stated another way, the TDS and NPDS are only representative of substantially similar portions of the input image because, although consecutive portions of the TDS are representative of adjacent portions of the input frame and are placed in consecutive ones of the successive sync blocks, the consecutive portions of the NPDS no longer bear the same spatial relation to the input frame as the TDS, due to their variable bit-length coding scheme.

The sequential sync blocks are then processed using conventional VTR signal processing circuits 24 and applied to a magnetic head 26 for recording the sync blocks sequentially on a magnetic tape 10 in a plurality of parallel slant tracks.

In the preferred embodiment, a hierarchical scheme is used for coding the NPDS, by reconstructing the TDS and then subtracting it from the input image before forming the NPDS. Deletion of the TDS from the NPDS results in a more efficient coding scheme, since the TDS information is already being separately provided. As shown in FIG. 2, the TDS is processed by an inverse vector quantizer 44 which recreates the decimated versions of the input images and a subband reconstruction module 46, which essentially comprises an interpolation circuit for operating on the pixels of the decimated images, reconstructing the original image frame. A subtraction circuit 48 subtracts the reconstructed TDS from the input frame for providing a reduced bit density input image to the normal play coding module 40.

Figure 3:
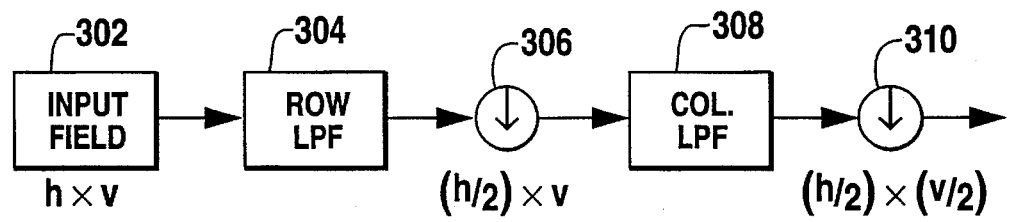
FIG. 3 illustrates subband decomposition and decimation, as used in the apparatus of FIG. 2.

FIG. 3 illustrates in block diagram form a representation of subband decomposition as used herein. An input image field 302 has an initial size of h×v (such as 720 pixels by 480 lines for the Y component). Separable filters 304 and 308 are used to low pass filter the rows and columns, respectively, of the input image before decimation by two rows via module 306 and two columns via module 310. As well known, the filters are needed to prevent aliasing after decimation. Also, the filters need not be separable, as they are shown in FIG. 3. Each pass of an image field through the processing of FIG. 3 results in one-half of the field width (h) and height (v). In the preferred embodiment, the Y and U, V components are decimated twice horizontally and once vertically to produce luminance fields of 180 by 120 pixels and chrominance fields of 90 by 120 pixels.

Figure 4:
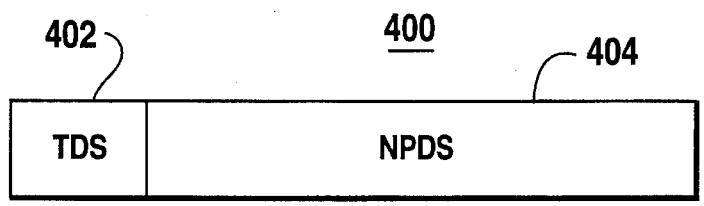
FIG. 4 illustrates a sync block, as generated by the apparatus of FIG. 2.

FIG. 4 illustrates the placement of the TDS and NPDS code words on the tape. A sync block or word 400 includes a first part 402 which accounts for approximately 10% of the length of block 400 and includes a portion of the fixed bit-length coded TDS recorded therein. As described later on, each portion can comprise 23 code words (for a 8×2 vector quantization), or 6 code words (for a 16×1 vector quantization). A second part 404 of word 400 includes a portion of the variable length coded NPDS recorded therein. For the sake of simplicity, not shown are additional parts of video sync words which are conventional, such as, data relating to identification of the sync words, error correction, e.g., parity, and other lower level "administrative" type of data normally included in digitized data systems.

As previously noted, the placement of data on the tape is important to the functioning of the present invention during trickplay. In the preferred embodiment, the data is recorded using one track for each field of the input image. Each track is divided into 240 sync words having a fixed length, with an average of one sync word for each line in the original image field.

Assuming e.g., that in the NPDS the bit rate is fixed over 4 frames, then the NPDS for these 4 frames spans all of the sync words over 8 parallel tracks (i.e., 4 frames). Thus, in order to decode the NPDS, the decoder must start at the beginning of an 8 track sequence to get all of the data from the successive sync words on these 8 tracks. However, the TDS is placed in the sync words so that ideally, only one sync words needs to be recovered to produce a line of the original image. During trickplay the decoder can thus, theoretically, use any of the recovered sync words, no matter where the recovery of data on the tape begins. In the present embodiment, however, due to current technology limitations with respect to tape bandwidth and bit density, 4 sync words are used to represent 4 lines of TDS code words. This still results, however, in an average of 1 sync word per image line and has been found to be acceptable. The manner of obtaining TDS code words representative of 4 lines results from the use of 8×2 pixel blocks when performing VQ of the decimated image, and will be discussed later on in greater detail during the description of the decoding circuitry.

Figure 5:
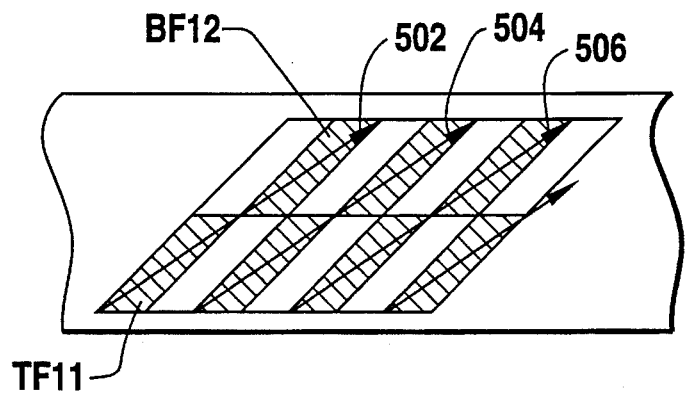
FIG. 5 illustrates placement and recovery of the sync blocks of FIG. 4 on a magnetic tape in accordance with the principles of the invention.

FIG. 5 illustrates how the recorded sync words are recovered during formation of a trickplay image. In general, the images formed during trickplay are similar to those formed by conventional analog VTR's during trickplay. That is, the trickplay image will consist of "strips" of consecutive lines of the input image sequence which are recovered as the magnetic heads skew across the tape. A tape 500 includes 240 sync words representative of each field, recorded on each of the parallel slant tracks. Thus, 2 adjacent tracks represent, e.g., field 1 and 2 of a given frame. When the VTR is operated at e.g., 2× normal play speed, the sync word data will be recovered in "strips" as indicated by the shading in FIG. 5. That is, as shown by the arrows in FIG. 5, each trickplay image will have a top half derived from the top 120 lines of the first field of a first frame ($TF_{11}$) and a bottom half derived from the last 120 lines of the second field ($BF_{12}$) of the first frame, and so on. This example is scalable to also be illustrative of data recovery at further multiples of the picture search speed.

During normal play, all the data is recovered (both TDS and NPDS) and normal play pictures are produced from the successively recovered sync blocks. During trickplay, however, for example at two times normal speed, one frame of video is produced for every two frames of the original input sequence. This is indicated by the pick-up of consecutive "strips" of the successive frames shown in FIG. 5 when the head scans a skewed track such as shown by arrows 502, 504 and 506.

As mentioned above, for trickplay it is critical that portions of the image be decodable without reference to any other portion of the image sequence. This constraint makes the use of motion compensation very difficult. The present invention avoids these difficulties by ignoring the NPDS during trickplay. During trickplay it is only necessary to get a minimum number (currently four, but ideally one) of sync words to decode the same minimum number of lines of the original picture. The data in the TDS portion of these sync words can be reconstructed, in accordance with the preferred embodiment, to reconstruct either two or four lines of the original field of video.

Referring again to FIG. 3, this processing creates a low resolution version of the input image (field or frame) by subband decomposition and decimation (SDD). The SDD image is then coded for recording or transmitting using vector quantization (VQ). The vector size for the VQ can be, for example, 8 by 2 or 16 by 1. An 8 by 2 vector size means each vector is representative of eight pixels horizontally and two pixels vertically of the SDD image. Note that each pixel in the vertical direction of the SDD image is representative of pixels over two horizontal lines of the input image and therefore each coded vector, being representative of pixels of two horizontal lines of the SDD, is representative of image information over four horizontal lines of the input image. If a vector size of 16 by 1 were used, it can be seen when applying the same analysis as described above for the 8 by 2 vector size, each VQ code word (a coded vector) will be representative of information over two lines.

Since a line width is 720 pixels (for luminance), a four times interpolation scheme allows recovery of 180 pixels to be sufficient to reconstruct the 720 pixel video image. Actually, an excess 12 pixels (or total of 192) are needed due to pixel "run-off", etc. Recovery of 24 VQ code words is then sufficient to reconstruct the full width of the input image. This is so because each of the 24 VQ code words, as noted above, is representative of 8 horizontal pixels (when using the 8 by 2 vector size) and 24 by 8 equals 192 pixels. Furthermore, since in accordance with the principles of the invention, an average of 1 image line is recorded per sync word, and since pixels from 4 image lines are represented by each VQ code word, it is necessary that each sync word include 6 VQ code words. Then, recovery of 4 sync words yields 24 code words which are representative of 4 full width lines of the input image. Thus, the desired average of 1 full horizontal line per sync word is established.

In accordance with the embodiment wherein the vector size is 16 by 1, only 13 (actual 12.5) VQ code words need to be recovered to obtain the 192 pixels needed to reconstruct the full width of the input image. Thus, using an average of 6 code words per sync word, only 2 sync words need to be recovered to reconstruct the full width image. Since each code word is representative of pixels from 2 adjacent lines of the input image, an average of 1 line per sync word is still maintained. As previously noted, it is this average of 1 complete image line per sync word which the inventors feel results in a more pleasing reconstruction of the input image during trickplay.

Figure 6:
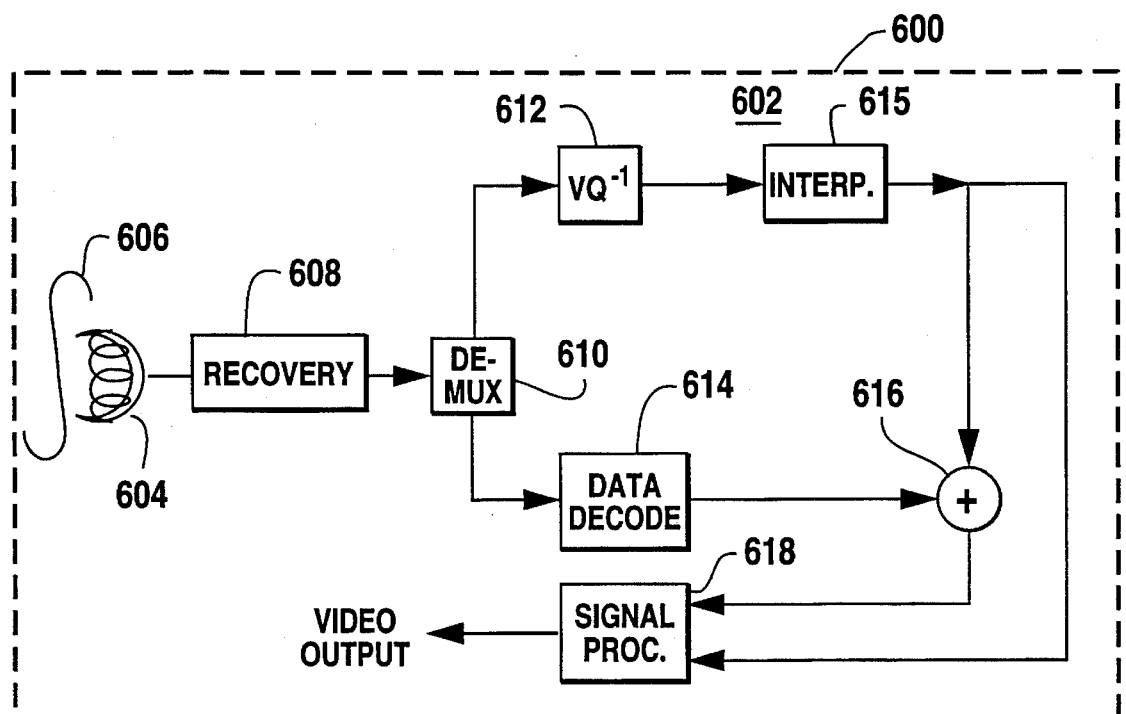
FIG. 6 is a block diagram of a digital VTR having a decoder for recovering data recorded using the apparatus of FIG. 2.

As shown in FIG. 6, a VTR 600 includes a decoder 602 as shown in FIG. 6. A conventional magnetic pick-up head 604 recovers the sync words from the tape 606 in conjunction with a recovery circuit 608 of conventional design. A demultiplexer 610 separates the TDS and NPDS data and provides the TDS data to an inverse VQ module 612 and the NPDS to a conventional MPEG data decoder 614 which is complimentary to the MPEG coding used in the encoding process of FIG. 2. Inverse VQ module 612 and an interpolator module 615 reconstruct the "small" images, in a manner similar to that already described with respect to module 44 and 46 of FIG. 2. Since the NPDS is hierarchically coded, the recovered TDS is combined by combiner 616 with the recovered NPDS to reconstruct the original NPDS. Signal processing circuits 618 (including D/A conversion) are then used to process the NPDS during normal play, or the TDS during high-speed search, for developing a conventional analog video output.

Thus, there has been shown and described a novel method and apparatus for digitally coding an image. Many changes, however, can become apparent after considering this specification. For example, although hierarchical coding is used, namely subtracting the TDS from the NPDS, this is not necessary to practice the present invention. Furthermore, during trickplay or normal play, unused portions of the encoder of FIG. 2 or the decoder of FIG. 6 can be deactivated. These and other changes and modifications are considered to be within the scope and spirit of the present invention which is limited only the claims which follow.

We claim:

1. An image carrier including a plurality of equal-length parallel slant tracks recorded therein, each track comprising a plurality of successively recorded sync blocks disposed in respective ones of each of a plurality of sub-intervals along the length of said track, wherein:

each said sync block is divided into at least first and second parts having first and second digital signals respectively coded therein, the first digital signal being used for reconstructing input images with relatively low resolution during a trickplay mode and the second digital signal being used for reconstructing input images with relatively high resolution during a normal play mode;

the first digital signal of each sync block is essentially representative of a prescribed fraction of a line by line scanning response to one of said input images, but the second digital signal of each sync block is not so constrained; and the second digital signal codes information concerning said input images with variable-bit-length coding and at times codes different fractions of said input images in different ones of said sync blocks.

2. An image carrier as recited in claim 1, wherein:

said first signal is generated by digitally processing said input images in accordance with a first image compression encoding technique so as to provide a first digital signal representative of low-resolution versions of said input images; and said second signal is generated by digitally processing said input image in accordance with a second image compression encoding technique which is different from said first image compression encoding technique so as to provide a second digital signal representative of higher-resolution versions of said input images.

3. An image carrier as recited in claim 2, wherein each sync block has portions of said first and second digital signals recorded therein which are simultaneously representative of approximately the same portion of an input image, but with different resolutions; and successive ones of said sync blocks in each said parallel slant track include consecutive portions of said first digital signal, which portions correspond to spatially adjacent portions of said input image.

4. The image carrier as recited in claim 2, wherein:

said first digital signal is encoded using fixed-bit-length codes;

said second digital signal is encoded using variable-bit-length codes;

each sync block includes a fixed number of bits of said first digital signal, said first digital signal being decodable without reference to any image coded signal from other ones of said sync blocks; and each sync block further includes a number of bits of said second digital signal, said second digital signal not being decodable without reference to portions of said second digital signal in other ones of said sync blocks.

5. An image carrier including a plurality of parallel slant tracks formed therein, said image carrier characterized in that:

each track has a predetermined length; and each track includes a plurality of successively recorded sync blocks disposed in respective ones of each of a plurality of subintervals of its length;

wherein each said sync block includes respective portions of first and second digital signals recorded therein;

wherein said first and second digital signals simultaneously represent approximately a predetermined portion of an input image;

wherein said first and second digital signals have first and second resolutions, respectively, different from each other; and wherein successive ones of said sync blocks include consecutive portions of said first digital signal, which portions correspond to spatially adjacent portions of said input image.

6. The image carrier as recited in claim 5, wherein:

said first digital signal is encoded using fixed-bit-length codes;

said second digital signal is encoded using variable-bit-length codes;

each sync block includes a fixed number of bits of said first digital signal, said first digital signal being decodable without reference to any image coded signal from other ones of said sync blocks; and each sync block includes a number of bits of said second digital signal, said second digital signal not being decodable without reference to portions of said second digital signal in other ones of said sync blocks.

7. The image carrier as recited in claim 6, wherein there is an average of one horizontal line of the input image represented by the first digital signal of each sync block.

8. The image carrier as recited in claim 5 wherein said sync blocks disposed in respective ones of each of the subintervals of the respective length of each said track include consecutive portions of said first signal, each of which said consecutive portions of said first signal describes a respective strip of said input image extending over substantially the entire distance between left and right edges of said input image, but extending over only a fraction of the entire distance between top and bottom edges of said input image.

9. An image carrier including a plurality of parallel slant tracks formed therein, wherein:

each slant track records along its length a respective plurality of successive sync blocks of similar lengths, the number of successive blocks recorded along the length of each of the slant tracks being in a prescribed ratio with the number of scan lines in a frame of video signal descriptive of an input image;

each said sync block is divided into at least first and second parts, said first parts of said sync blocks each having a first prescribed number of bits of a first digital signal coded therein and said second parts of said sync blocks each having a second prescribed number of bits of a second digital signal coded therein, said second number being larger than said first number, the first digital signal coding said input images as raster scanned in reduced-resolution form for reproduction during a trickplay mode and the second digital signal comprising variable-bit-length codes permitting reproduction of said input images in full-resolution form during a normal-play mode; and the first prescribed number of bits of the first digital signal of each sync block is representative of a prescribed portion of one of said input images as raster-scanned in reduced-resolution form.

10. The image carrier as set forth in claim 9, wherein said first digital signal comprises fixed-bit-length codes descriptive of vector quantized portions of said input images as raster-scanned in reduced-resolution form.

11. The image carrier as set forth in claim 10, wherein said second digital signal codes differences between said input images and reproductions of said input images as reproduced from said fixed-bit-length codes descriptive of vector quantized portions of said input images as raster-scanned in reduced-resolution form.

12. The image carrier as set forth in claim 9, wherein said second digital signal codes differences between said input images and reproductions of said input images as reproduced from said first digital signal.

13. A video tape storing processed signals representing at least one video image, characterized in that said video tape includes a plurality of parallel slant tracks, each of said tracks formed by a predetermined number of sync blocks collectively defining a predetermined length, wherein each said sync block includes respective portions of first and second digital signals recorded therein;

wherein, in each said sync block, said respective portion of said first digital signal recorded therein represents a predetermined portion of an input image with relatively low resolution, and said respective portion of said second digital signal recorded therein represents substantially the same predetermined portion of said input image with relatively high resolution;

wherein said respective portion of first digital signal permits independent decoding of said predetermined portion of an input image with relatively low resolution without reference to other portions of first digital signal nor to said second digital signal; and wherein said respective portion of second digital signal permits decoding of said predetermined portion of an input image with relatively high resolution, by combining another decoding result with a result of decoding said respective portion of second digital signal.

14. The video tape as recited in claim 13, wherein independent decoding of the respective portion of first digital signal recorded in each said sync block generates a respective decoding result descriptive of said predetermined portion of an input image with relatively low resolution used as said other result in decoding said predetermined portion of an input image with relatively high resolution.

15. The video tape as recited in claim 13, wherein said decoding of said predetermined portion of an input image with relatively high resolution is accomplished by combining results from decoding the respective portions of said second digital signal from different sync blocks.

16. An image carrier including a plurality of parallel slant tracks formed therein, said image carrier characterized in that:

each track has a predetermined length; and each track includes a plurality of successively recorded sync blocks disposed in respective ones of each of a plurality of subintervals of its length;

wherein each said sync block includes respective portions of first and second digital signals recorded therein;

wherein, in each said sync block, said respective portion of said first digital signal recorded therein represents a predetermined portion of an input image with relatively low resolution, and said respective portion of said second digital signal recorded therein represents substantially the same predetermined portion of said input image with relatively high resolution; and wherein successive ones of said sync blocks include consecutive portions of said first digital signal, which portions correspond to spatially adjacent portions of said input image.

17. The image carrier as recited in claim 16 wherein each of said consecutive portions of said first signal describes a respective strip of said input image extending over substantially the entire distance between left and right edges of said input image, but extending over only a fraction of the entire distance between top and bottom edges of said input image.

18. The image carrier as recited in claim 16, wherein:

said first digital signal is encoded using fixed-bit-length codes;

said second digital signal is encoded using variable-bit-length codes;

each sync block includes a fixed number of bits of said first digital signal as its said respective portion of said first digital signal, which said respective portion of first digital signal permits independent decoding of said predetermined portion of an input image with relatively low resolution without reference to other portions of first digital signal nor to said second digital signal; and each sync block includes a number of bits of said second digital signal as its said respective portion of said second digital signal, which said respective portion of second digital signal permits decoding of said predetermined portion of an input image with relatively high resolution, by combining another decoding result with a result of decoding said respective portion of second digital signal.

19. A video tape as recited in claim 18, wherein independent decoding of the respective portion of first digital signal recorded in each said sync block generates a respective decoding result descriptive of said predetermined portion of an input image with relatively low resolution used as said other result in decoding said predetermined portion of an input image with relatively high resolution.

20. A video tape as recited in claim 18, wherein said decoding of said predetermined portion of an input image with relatively high resolution is accomplished by combining results from decoding the respective portions of said second digital signal from different sync blocks.

* * * * *